W. A. DRYDEN.
Wheel Cultivator.
No. 85,292.
Patented Dec. 29, 1868.
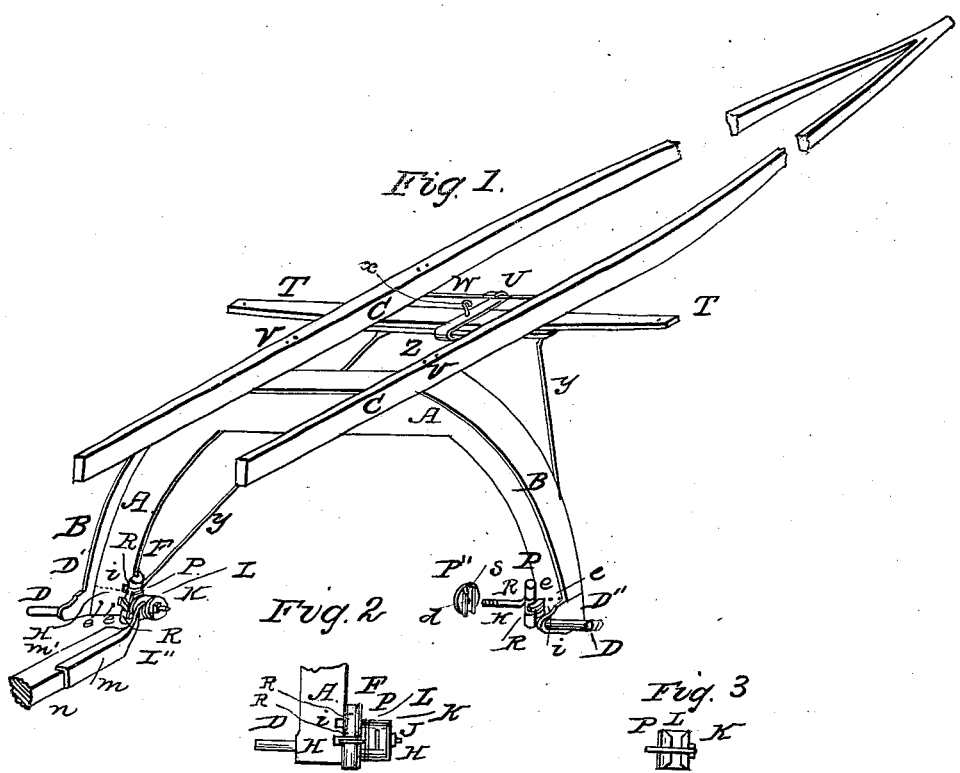

WILLIAM A. DRYDEN, OF MONMOUTH, ILLINOIS, ASSIGNOR TO HIMSELF AND JOHN M. TURNBULL, OF SAME PLACE.

*Letters Patent No. 85,292, dated December 29, 1868.*

---

IMPROVEMENT IN CULTIVATORS.

---

The Schedule referred to in these Letters Patent and making part of the same.

---

*To all whom it may concern:*

Be it known that I, WILLIAM A. DRYDEN, of Monmouth, in the county of Warren, and State of Illinois, have invented certain new and useful Improvements in Cultivators; and I do hereby declare that the following is a full, clear, and exact description of the same, reference being had to the accompanying drawings, making a part of this specification, in which—

Figure 1 is a perspective view of my invention.

Figure 2 is a side view of the joint for attaching the plows to the main frame.

Figure 3 is a vertical sectional view of a part of joint, shown at fig. 2.

Similar letters of reference indicate corresponding parts in all the figures.

The nature of my invention relates to improvements in cultivators; and

The invention consists in casting the axle with a vertical spindle, on which and to which the plows may be hinged.

Letter A is the axle, formed of cast-iron, and bent in the form shown.

Letters D D" are the spindles, and plates for attaching the spindles to the axle.

These spindles D are also cast, and are bolted or riveted to the axle A by bolts, $e\ e$.

Letter C is the tongue, which is simply bolted on to the axle at $v$.

Letter F represents cylinders, cast solid to the axle A, at the lower end, and inside of the axle-ends.

Letter H represents hooks, partly enclosing the cylinders F, and carry nut J at the outer end.

Letter P" represents a disk, flat on the outer side, and having the section of a cylinder, $s$, on the opposite side, which fits closely to the cylinder F.

On the inside of sectional cylinder $s$ is a tongue, $d$, which fits snugly in the grooves R on cylinder F, and prevents the disk P from dropping its weight on the hook H, together with the weight of balance of joint and attachments.

Letter L represents the end of the beam-plate, fitting on the bolt or hook H, and between the disk P and washer K. At fig. 3, the vertical section of this plate shows the manner it is countersunk, and the manner the disk P and washer K are fitted in the counter-sinks, so as to throw the bearings of the plate L on to the disk P and washer K.

The whole joint is held in place by the nut J. This joint, it will be easily seen, admits of free vertical movement of the plows on the bearings on disk P and washer K, and lateral movement of the plows by the hook H on the cylinder F.

Vertical adjustment of the plows may be obtained by moving the hook H higher or lower on the cylinder F, and the hook will be held in any desired place by means of the tongue $d$, on sectional cylinder $s$, operating in grooves R on the cylinder F.

The beam-plate is attached on one side of the beam, and curved, as shown at L, and admits of regulating or changing the distance of the plows apart, by inverting the plates L $m$.

Letter T represents the double-tree, which is pivoted on the bar Z.

This bar Z is connected to the axle by means of rods $y$, thereby connecting the main draught with the level of the joint for connecting the beams to the axle, while the slide U, operating over the rod W, will keep the double-tree always in place and up to the tongue. At the same time it will serve to equalize the draught and prevent pressure on the necks of the horses.

Having thus described my invention,

What I claim as new, and desire to secure by Letters Patent, is—

The metal axle, with a vertical coupling-spindle, F, cast thereon as a part of the same, substantially as described, and for the purpose set forth.

Signed, this 5th day of October, 1868.

W. A. DRYDEN.

Witnesses:
D. E. BOON,
D. B. STANCLIFF.